US012737100B2

(12) United States Patent
Doll

(10) Patent No.: US 12,737,100 B2
(45) Date of Patent: Sep. 15, 2026

(54) GEOMETRIC TARGETING FOR LIGHTWEIGHT VIEWER

(71) Applicant: RTX CORPORATION, Farmington, CT (US)

(72) Inventor: Stephen Doll, Ponte Vedra, FL (US)

(73) Assignee: RTX CORPORATION, Farmington, CT (US)

( * ) Notice: Subject to any disclaimer, the term of this patent is extended or adjusted under 35 U.S.C. 154(b) by 241 days.

(21) Appl. No.: 18/467,849

(22) Filed: Sep. 15, 2023

(65) Prior Publication Data

US 2025/0094029 A1 Mar. 20, 2025

(51) Int. Cl.

*G06F 3/048* (2013.01)
*G06F 3/0482* (2013.01)
*G06F 3/04845* (2022.01)
*G06T 17/20* (2006.01)

(52) U.S. Cl.

CPC ........ *G06F 3/04845* (2013.01); *G06F 3/0482* (2013.01); *G06T 17/20* (2013.01); *G06T 2200/24* (2013.01)

(58) Field of Classification Search

CPC ............... G06F 3/04845; G06F 3/0482; G06F 2111/02; G06F 2111/16; G06F 30/12; G06T 17/20; G06T 2200/24; G06T 19/20

See application file for complete search history.

(56) References Cited

U.S. PATENT DOCUMENTS 7,613,539 B2 11/2009 Bae et al.
7,688,318 B2 3/2010 O'Malley et al.
8,355,020 B1 * 1/2013 Hanau .................... G06T 17/20 345/428
8,400,446 B2 3/2013 Gatzke et al.
8,922,576 B2 12/2014 Hickman et al.

(Continued)

FOREIGN PATENT DOCUMENTS

| | | | |
|---|---|---|---|
| CN | 115099431 | 9/2022 | |
| KR | 102022100285 | 7/2022 | |
| WO | WO-2024112994 A1 * | 6/2024 | ............ G06T 11/00 |

OTHER PUBLICATIONS

Adobe. Material properties: Substance 3D designer. Retrieved from: https://helpx.adobe.com/substance-3d-designer/interface/3d-view/material-properties.html.

(Continued)

*Primary Examiner* — Rashawn N Tillery
(74) *Attorney, Agent, or Firm* — Carlson, Gaskey & Olds, P.C.

(57) ABSTRACT

A user interface for a lightweight viewer may include, among other things, a viewing window operable to display geometry established by one or more geometric objects of a tessellated model. The one or more geometric objects include one or more visual attributes that depict the respective geometry. A palette menu is established by a plurality of menu objects of the tessellated model. The menu objects are assigned respective visual attribute settings. The menu objects are associated with the one or more geometric objects such that selection of the respective menu object causes at least one of the one or more visual attributes of the associated one or more geometric objects to update in the viewing window according to the respective visual attribute setting. A method of establishing a tessellated model is also disclosed.

21 Claims, 11 Drawing Sheets

(56) References Cited

U.S. PATENT DOCUMENTS 9,152,435 B2 10/2015 Williamson
9,305,390 B2 4/2016 Schlichte et al.
9,761,045 B1 9/2017 Cote et al.
9,870,436 B2 1/2018 Lorono et al.
9,886,530 B2 2/2018 Mehr et al.
10,031,640 B2 7/2018 Hilton et al.
10,121,286 B2 11/2018 Alsaffar et al.
10,872,465 B2 12/2020 Cochrane et al.
11,308,245 B2 4/2022 Yang et al.
11,429,756 B2 8/2022 Birkett-Smith et al.
11,810,659 B2 11/2023 Imasugi et al.
11,893,312 B2 2/2024 Baran et al.
2002/0169586 A1* 11/2002 Rankin, II ............ G06T 7/0004 703/1
2006/0155418 A1* 7/2006 Bradbury ........... G05B 19/4099 700/182
2007/0279414 A1* 12/2007 Vandenbrande .......... G06T 7/33 345/420
2008/0312764 A1* 12/2008 Murrish .................. G06F 30/00 700/98
2013/0249906 A1* 9/2013 Gunderson ............. G06T 15/20 345/420
2016/0133049 A1* 5/2016 Hill ......................... G06T 19/20 700/98
2016/0162603 A1* 6/2016 Schriesheim ........... G06F 30/00 703/1
2017/0193695 A1* 7/2017 Lama ...................... G06T 19/20
2020/0349299 A1* 11/2020 Macloud ................. G06F 30/12
2021/0158612 A1* 5/2021 Cao ......................... G06T 19/20
2022/0198077 A1 6/2022 Mora et al.
2023/0083607 A1* 3/2023 Sarshar ................... G06T 17/00 345/420

OTHER PUBLICATIONS

European Search Report for European Patent Application No. 24200403.4 mailed Jan. 29, 2025.

Ding, L., Ball, A., Matthews, J., McMahon, C., & Patel, M. (2009). Annotation of lightweight formats for long-term product representations. International Journal of Computer Integrated Manufacturing, 22:11, 1037-1053.

* cited by examiner 20
22
COMPUTING DEVICE(S)
24
PROCESSOR(S)
26
MEMORY
28
MODELING ENVIRONMENT
30
CAD SYSTEM
34
33
50,50A
API
39
TRANSLATION MODULE
33,36
40
38
COMPUTING DEVICE(S)
42
PROCESSOR(S)
44
MEMORY
46
48
33
50,50B
API
CAD MODEL(S)
32
TESSELLATED MODEL(S)
36
FILE(S)
37

52-4
64
58
64
66
INFO
REVISIONS
NOTES
BOM
SEARCH
- APPROVALS -
APPROVER 1
APPROVER 2
58,58-1
60
62

- OTHER INFO -
STATEMENT ...
STATEMENT ...

52-4
64
64
68
66
INFO
REVISIONS
NOTES
BOM
SEARCH
(2 ITEMS)
CT-1424599 X BRACKET
ST2984-10 4 INSERT OPTION (IC)
59
58,58-2
60

62

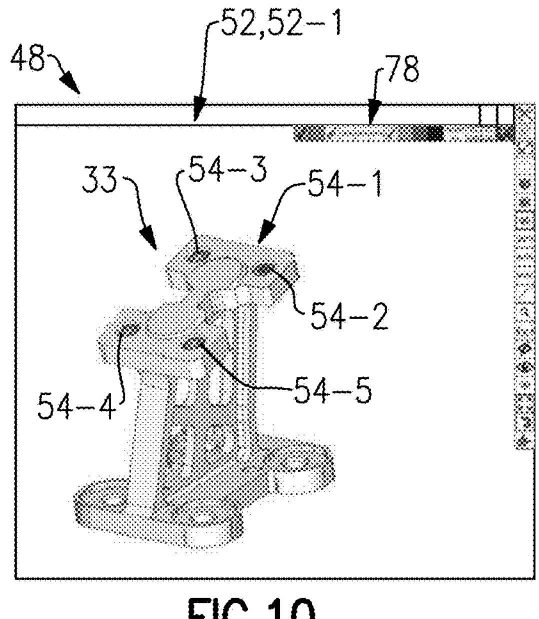
FIG.10
48
52,52-1
78
33
54-3
54-1
54-2
54-4
54-5
FIG.11
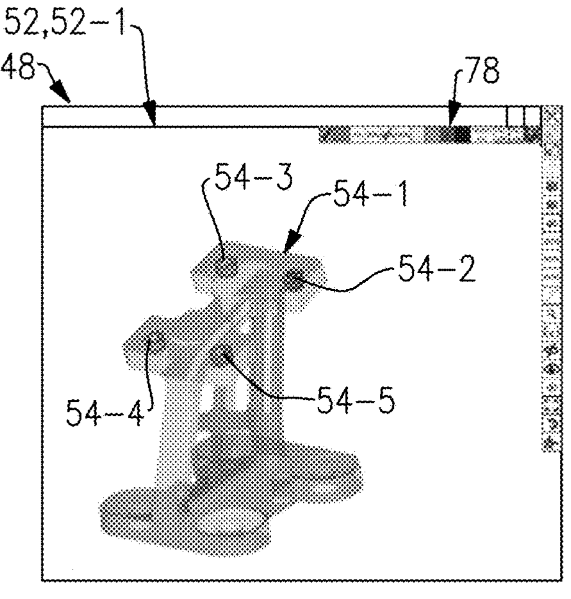
FIG.12
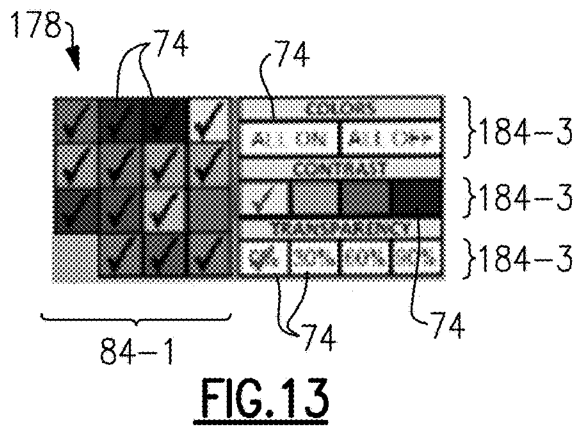
FIG.13

GEOMETRIC TARGETING FOR LIGHTWEIGHT VIEWER

BACKGROUND

This disclosure relates to modeling and interaction with the design of various components.

Computer-Aided Design (CAD) systems are known and may be utilized to generate two-dimensional and three-dimensional (3D) models of various components. The associated CAD files may be relatively large, which may impede transfer to other computing systems. A lightweight, tessellated representation of the CAD model may be generated and stored within a file that excludes the original CAD model. The file may be saved in a Portable Document Format (PDF) or another file format. A lightweight viewer may be utilized to view the lightweight representation.

SUMMARY

A user interface for a lightweight viewer according to an example of the present disclosure includes a viewing window operable to display geometry established by one or more geometric objects of a tessellated model. The one or more geometric objects have one or more visual attributes that depict the respective geometry. A palette menu is established by a plurality of menu objects of the tessellated model. The menu objects are assigned respective visual attribute settings. The menu objects are associated with the one or more geometric objects such that selection of the respective menu object causes at least one of the one or more visual attributes of the associated one or more geometric objects to update in the viewing window according to the respective visual attribute setting.

In a further embodiment of any of the foregoing embodiments, one or more of the menu objects are operable to toggle between activation of at least two of the visual attribute settings in response to user interaction with the palette menu.

In a further embodiment of any of the foregoing embodiments, the menu objects include a first set of menu objects assigned different visual attribute settings associated with a common visual attribute type.

In a further embodiment of any of the foregoing embodiments, the visual attributes are associated with a color attribute type associated with a set of colors and a transparency attribute type associated with a set of transparency levels.

In a further embodiment of any of the foregoing embodiments, the palette menu is selectively displayed in a portion of a display region common with the viewing window in response to user interaction with a control object.

In a further embodiment of any of the foregoing embodiments, the visual attributes are associated with a first mode and a second mode of the tessellated model associated with different depictions of the geometry. The menu objects include a first menu object and a second menu object. The first menu object is operable to cause all of the one or more geometric objects to be displayed in the viewing window according to the first mode. The second menu object is operable to cause all of the one or more geometric objects to be displayed in the viewing window according to the second mode.

In a further embodiment of any of the foregoing embodiments, the visual attribute settings include a first set of attribute settings and a second set of attribute settings. The menu objects include an invert menu object operable to toggle between applying the first and second sets of attribute settings to the one or more menu objects.

In a further embodiment of any of the foregoing embodiments, the menu objects are established according to a hierarchy such that selection of one of the menu objects at a relatively higher level of the hierarchy causes the respective one or more geometric objects to be displayed in the viewing window according to the respective visual attribute setting and blocks activation of the visual attribute setting associated with any menu object at a relatively lower level of the hierarchy when the menu object at the relatively higher level is active.

In a further embodiment of any of the foregoing embodiments, the tessellated model excludes any CAD model associated with the geometry.

A system for generating a tessellated model according to an example of the present disclosure includes a computing device that has one or more processors coupled to memory. The computing device is operable to execute a modeling environment. The modeling environment is operable to access a computer-aided design (CAD) model associated with geometry and generate one or more geometric objects that establish a tessellation of the geometry. The one or more geometric objects have one or more visual attributes that depict the respective geometry. The modeling environment is operable to generate a plurality of menu objects associated with the one or more geometric objects, assign respective visual attribute settings to the menu objects, and generate a tessellated model having the one or more geometric objects and the menu objects. The one or more geometric objects are operable to display the tessellation of the geometry in a viewing window of a user interface. The menu objects are operable to establish a palette menu in the user interface. The menu objects are operable to cause the viewing window to depict the respective one or more geometric objects according to the respective visual attribute settings in response to user interaction.

In a further embodiment of any of the foregoing embodiments, the menu objects include a first set of menu objects assigned different visual attribute settings associated with a common one of the visual attributes.

In a further embodiment of any of the foregoing embodiments, the menu objects include a first menu object and a second menu object. The first menu object is operable to apply one or more respective visual attribute settings to all the one or more geometric objects. The second menu object is operable to apply one or more different visual attribute settings to all the one or more geometric objects.

In a further embodiment of any of the foregoing embodiments, the visual attribute settings include a first set of attribute settings and a second set of attribute settings. The menu objects include an invert menu object operable to toggle between applying the first and second sets of attribute settings to the one or more geometric objects.

In a further embodiment of any of the foregoing embodiments, the menu objects are established according to a hierarchy such that selection of one of the menu objects at a relatively higher level of the hierarchy causes the respective one or more geometric objects to be displayed in the viewing window according to the respective visual attribute setting and blocks activation of the visual attribute setting associated with any menu object at a relatively lower level of the hierarchy when the menu object at the relatively higher level is active.

In a further embodiment of any of the foregoing embodiments, the modeling environment is operable to store the tessellated model in a file readable by a lightweight viewer. The file excludes the CAD model.

In a further embodiment of any of the foregoing embodiments, the modeling environment is operable to store code in the file that is operable to cause one or more functions associated with the tessellated model to execute in the lightweight viewer.

A method of establishing a tessellated model according to an example of the present disclosure includes generating one or more geometric objects that establish a tessellation of geometry stored in a computer-aided design (CAD) model. The one or more geometric objects are operable to display the tessellation of the geometry in a viewing window of a user interface. The one or more geometric objects include one or more visual attributes that depict the respective geometry. The method includes generating a plurality of menu objects associated with the one or more geometric objects. The menu objects are operable to establish a palette menu in the user interface. The method includes assigning respective visual attribute settings to the menu objects. The menu objects are operable to cause the viewing window to depict the respective one or more geometric objects according to the respective visual attribute settings in response to user interaction. The method includes generating a tessellated model including the one or more geometric objects and the menu objects.

In a further embodiment of any of the foregoing embodiments, the visual attributes are associated with a color attribute type associated with a set of colors and a transparency attribute type associated with a set of transparency levels. The step of generating the menu objects occurs such that the palette menu displays a set of menu items associated with the set of colors and the set of transparency levels.

In a further embodiment of any of the foregoing embodiments, the menu objects are established according to a hierarchy such that selection of a menu object relatively higher in the hierarchy blocks application of the visual attribute setting associated with any lesser menu object in the hierarchy to the respective one or more geometric objects prior to deactivation of the higher menu object, but permits application of the visual attribute setting associated with the lesser menu object subsequent to deactivation of the higher menu object.

A further embodiment of any of the foregoing embodiments includes storing the tessellated model in a file that excludes the CAD model.

A further embodiment of any of the foregoing embodiments includes displaying the tessellated model in a lightweight viewer.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 10 discloses a depiction of geometry utilizing the palette menu of FIG. 9.

FIG. 11 discloses another depiction of geometry utilizing the palette menu of FIG. 9.

FIG. 12 discloses another depiction of geometry utilizing the palette menu of FIG. 9.

FIG. 13 discloses another palette menu.

Like reference numbers and designations in the various drawings indicate like elements.

DETAILED DESCRIPTION

Model-based definition (MBD) is the process of replacing conventional drawings with 3D models. With 2D drawings, many section views may be utilized to define internal features of a part. When viewing the same definition in a 3D model, internal features may be difficult to see and/or define when viewing various aspects of the model. Transparencies may be used, but every aspect of the model may be shown with the same transparency level, which may make it difficult to interpret internal features from external features of the model.

The disclosed techniques include establishing a palette menu (e.g., color palette) in a user interface for interacting with a tessellated model. The user interface may be established in a lightweight viewer that accesses the tessellated model. The user may interact with the palette menu to modify individual (e.g., targeted) colors, transparencies, contrasts and/or other display aspects of the model geometry. The user may interact with the palette menu to specify display manipulations. The parameters of the original attributes and modifications may be managed to change the display of the objects shown in the viewing area. The palette menu may be embedded in a display window of the lightweight viewer. The user may change the visual attributes of a targeted object, while other graphical objects remain unchanged. Application programming interface (API) functions may be used to create the palette menu and associated functionality. The API may not include a palette menu, but it may have field objects that may be configured to look like a palette menu. The code (e.g., script) to generate the palette menu may be embedded within the same tessellated file associated with the tessellated geometry. The tessellated file may be stored in a lightweight format, such as a Portable Document File (PDF) format. Accordingly, the lightweight viewer does not have to be programmed to support the palette menu and any lightweight viewer that supports the file format may access the model and palette menu.

Figure 1:
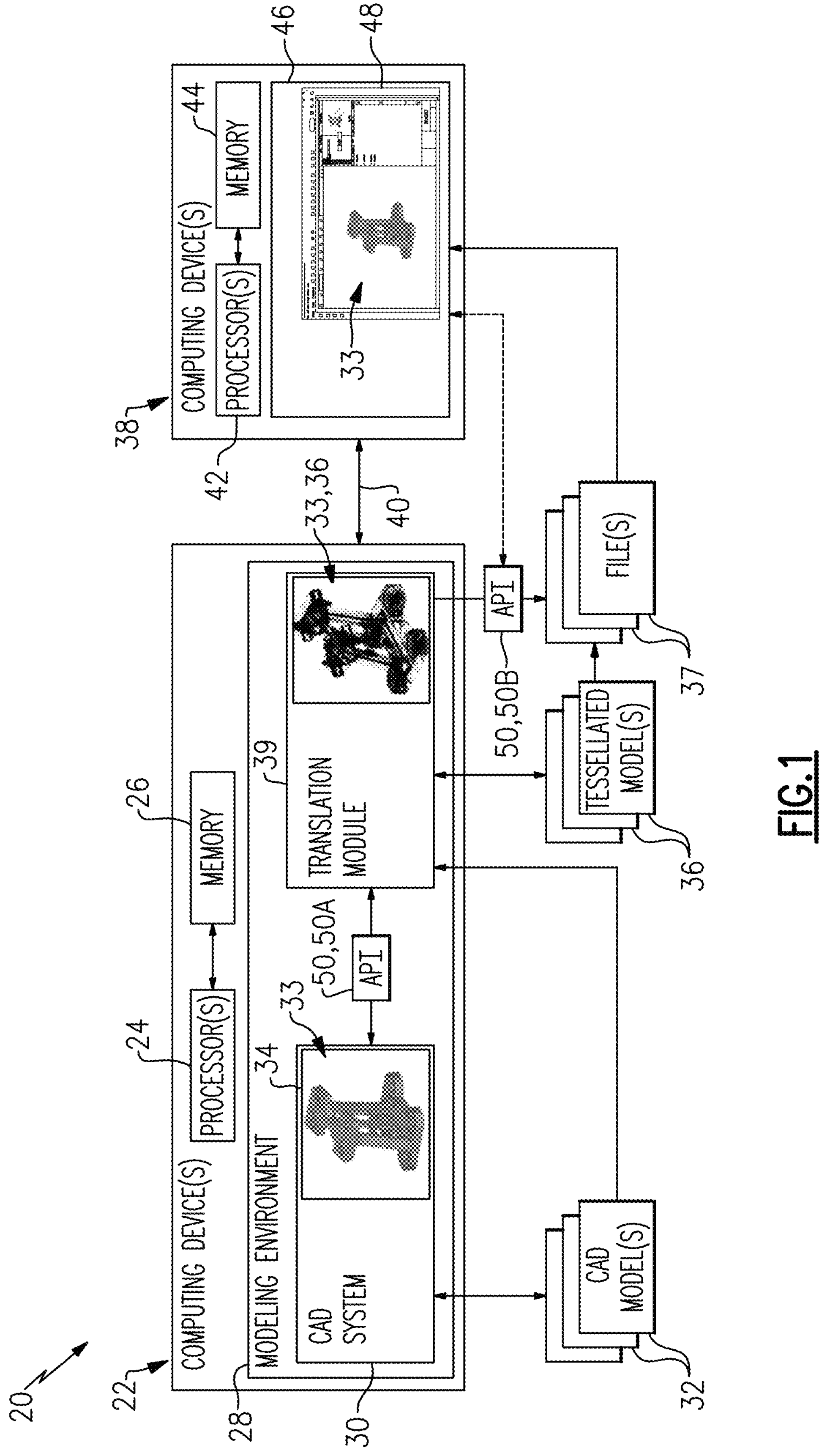
FIG. 1 discloses a modeling system.

FIG. 1 discloses a modeling system 20. The modeling system 20 may be operable to interact with one or more computer-aided design (CAD) models. The modeling system 20 may be operable to generate one or more tessellated models from the CAD model(s). The tessellated model may be relatively compact and may include a lesser amount of data compared to the CAD model. The tessellated model may represent CAD geometry as a set of facets (e.g., triangles) that may be patched together (see, e.g., FIG. 2). Each of the facets may be defined by three respective points of a point cloud. The features disclosed herein may be incorporated into, or may otherwise be utilized with, a lightweight viewer. The tessellated models may be viewable in the lightweight viewer. For the purposes of this disclosure, a "lightweight viewer" is a software application suitable to view tessellated models. The lightweight viewer may be operable to view and interact with, but not edit, the tessellated model. Lightweight viewers may include a 3D PDF or HTML viewer or another viewer such as JT2Go operable to access tessellated models stored in a lightweight file format.

The modeling system 20 may include at least one computing device 22. The computing device 22 may include one or more processors 24 coupled to memory 26. The computing device 22 may be operable to execute a modeling environment (e.g., tool) 28. The modeling environment 28 may incorporate or may otherwise interface with a CAD system 30 (e.g., CATIA, AutoCAD, Solidworks, Siemens NX, etc.). The CAD system 30 and/or another portion of the modeling environment 28 may be operable to access one or more CAD models 32. Each of the CAD models 32 may be associated with geometry. The geometry may be associated with one or more virtual and/or physical components, assemblies and/or systems. The CAD system 30 may be operable to display one or more of the CAD models 32 in a user interface 34.

A user may desire to share or otherwise communicate information associated with the design to one or more other users, such as another member of a development team, a customer, or a supplier. The modeling environment 28 may be operable to generate one or more tessellated models 36, which may have a relatively lesser amount of information than the associated CAD model(s) 32 for communication to the other users. The tessellated model 36 may be stored in one or more lightweight files 37. The CAD model 32 and tessellated model 36 may be associated with geometry 33 (e.g., FIGS. 2 and 4A). The tessellated model 36 may exclude the exact CAD geometry and/or any CAD model 32 associated with the geometry 33.

Figure 2:
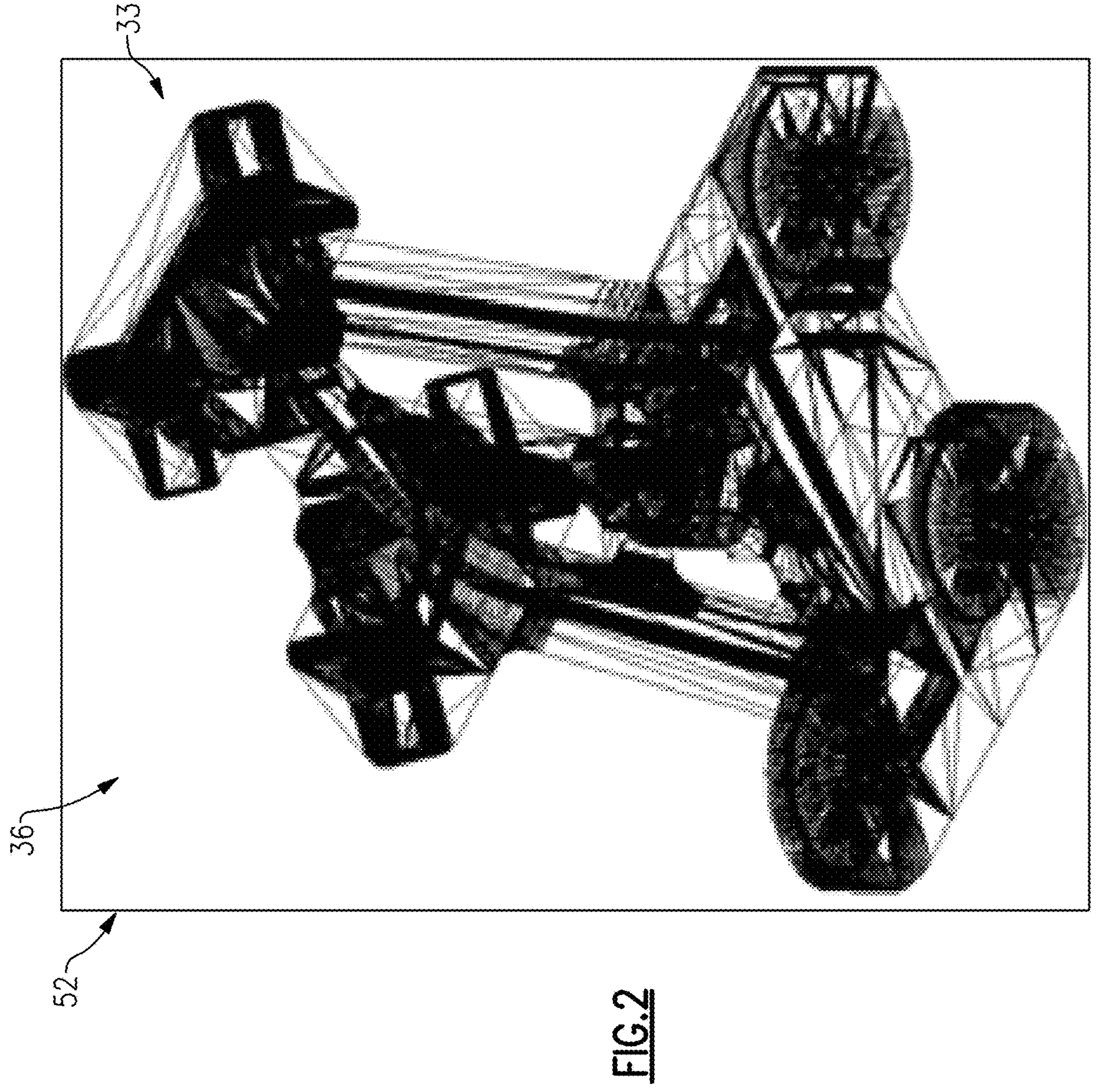
FIG. 2 discloses a graphical depiction of a tessellated model.

Various users may access and review the tessellated models 36 in a lightweight viewer. Various lightweight viewers may be utilized, such as Adobe which may be operable to access PDF files. The lightweight viewer may be operable to access and view lightweight files containing tessellated models but not any files containing CAD models, including the exact CAD geometry. In other implementations, the modeling environment 28 may be operable to store the tessellated model 36 and the exact CAD geometry in the same file. Each of the tessellated models 36 may be associated with one or more respective CAD models 32 that store the exact CAD geometry and related information. FIG. 2 discloses a graphical depiction of a tessellated model 36 according to an implementation. The specific geometry of the depicted tessellated model 36 is not intended to limit this disclosure.

The modeling environment 28 may be operable to access and display each of the tessellated models 36. In implementations, one or more (e.g., client) computing devices 38 may be operable to access the tessellated models 36. The computing devices 22, 38 may include one or more computer processors, memory, storage means, network devices, input and/or output devices, and/or interfaces. The computing devices 22, 38 may be operable to execute one or more software programs, including one or more portions of the modeling environment 28. The computing devices 22, 38 may be operable to communicate with one or more networks established by one or more computing devices. The memory may include UVPROM, EEPROM, FLASH, RAM, ROM, DVD, CD, a hard drive, or other computer readable medium which may store data and/or the functionality of this description. The computing devices 22, 38 may be a desktop computer, laptop computer, smart phone, tablet, or any other computer device. Input devices may include a keyboard, mouse, touchscreen, etc. The output devices may include a monitor, speakers, printers, etc. Each of the computing devices 38 may include one or more processors 42 coupled to memory 44. The computing device 38 may be coupled to the computing device 22 by connection(s) 40. The connection 40 may be a wired and/or wireless connection. The connection 40 may be established over one or more networks and/or other computing systems.

The processor 42 of the computing device 38 may be operable to execute a lightweight viewer 46. The lightweight viewer 46 may be a separate software application executable by the computing device 38 or may be a service provided by the computing device 22 which may be accessible by a thin client or browser over a network connection. The lightweight viewer 46 may be operable to access the tessellated models 36. The lightweight viewer 46 may be displayed in a display device. The lightweight viewer 46 may include a graphical user interface (GUI) 48 operable to display the tessellated model 36. The lightweight viewer 46 may be operable to read tessellated models 36 but not any CAD models 32, including CAD models 32 relating to geometry associated with the tessellated models 36.

Various techniques may be utilized to establish the tessellated models 36. The modeling environment 28 may be operable to generate one or more objects (e.g., elements), including any of the objects disclosed herein. In implementations, the objects may be field objects. The tessellated model 36 may include one or more field objects. The field objects and associated contents may be embedded within the tessellated model 36. The modeling environment 28 may include, or may otherwise interface with, one or more application programming interfaces (API) 50. In the implementation of FIG. 1, the system 20 may include or otherwise interface with a first API 50A and a second API 50B. The functionality of the APIs 50A, 50B may be incorporated into a single API 50 or may be distributed between three or more APIs 50. The CAD system 30 and/or lightweight viewer 46 may be operable to interact with the respective CAD models 32 and tessellated models 36 according to the API 50. The lightweight viewer 46 may be configured to recognize objects, function calls, data structures, etc. specified in the API(s) 50. The API 50 may be utilized to establish one or more tessellated models 36. The API 50 may be utilized to convert the CAD models 32 to tessellated models 36. The modeling environment 28 may include a translation module 39 operable to establish tessellated models 36 and/or lightweight files 37. The translation module 39 may be operable to interact with the API 50B to establish (e.g., render) tessellated models 36. The translation module 39 may be operable to interact with the API 50B to establish lightweight files 37 including tessellated model(s) 36 in a format (e.g., data structure) supported by the API 50B and/or lightweight viewer 46. The API 50 may be utilized to assign various information, scripts and other data to one or more fields of the field objects. The field objects may be established according to data structure(s) specified in the API 50. The API 50 may provide the ability to associate scripts with objects of the tessellated model 36. The code (e.g., script) to generate the disclosed features and/or any code that causes any associated functions to occur in the lightweight viewer (e.g., in response to selection of the objects of the model 36) may be embedded within the same lightweight file 37 as the objects of the model 36 associated with the model geometry 33. The scripts and other code may be executed in response to user interaction and/or selection of the respective field object. The script may be specified according to JavaScript or another scripting language supported by the API 50. Storing the code that causes the function(s) associated with the objects and other features in the lightweight file 37 itself allows for the publisher to control the file presentation directly and does not require a special viewer.

Figure 3:
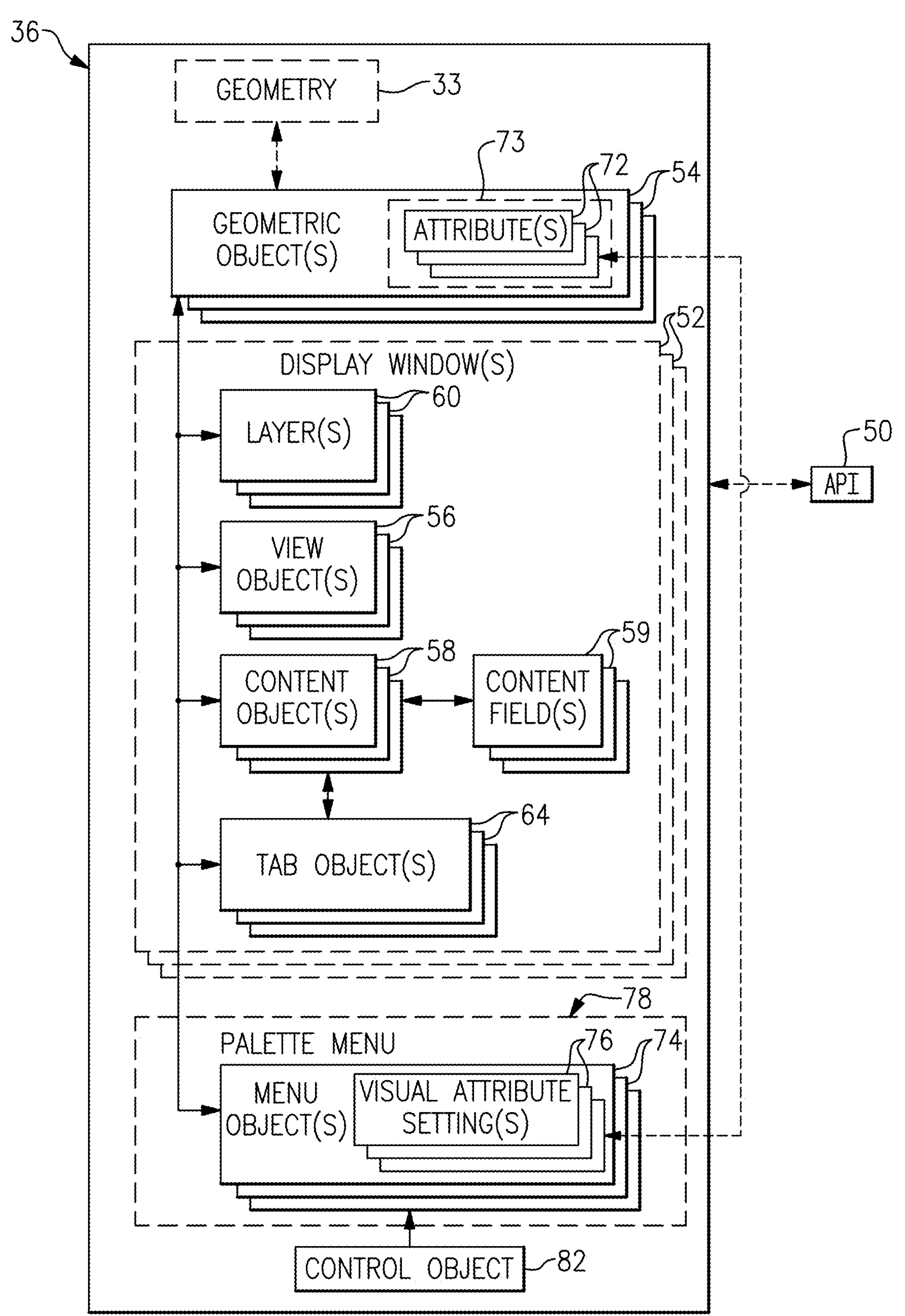
FIG. 3 discloses an arrangement of a tessellated model.

FIG. 3 schematically illustrates a tessellated model 36 according to an implementation. The tessellated model 36 may include any of the objects and associated structures disclosed herein. The tessellated model 36 may be established with respect to one or more data structures specified in the API 50. Various techniques may be utilized to establish relationships between the various objects of the tessellated model 36, including one or more static and/or dynamic links which may be specified in field(s) of the field objects. The API 50 may be utilized to establish the objects and links.

Figure 4A:
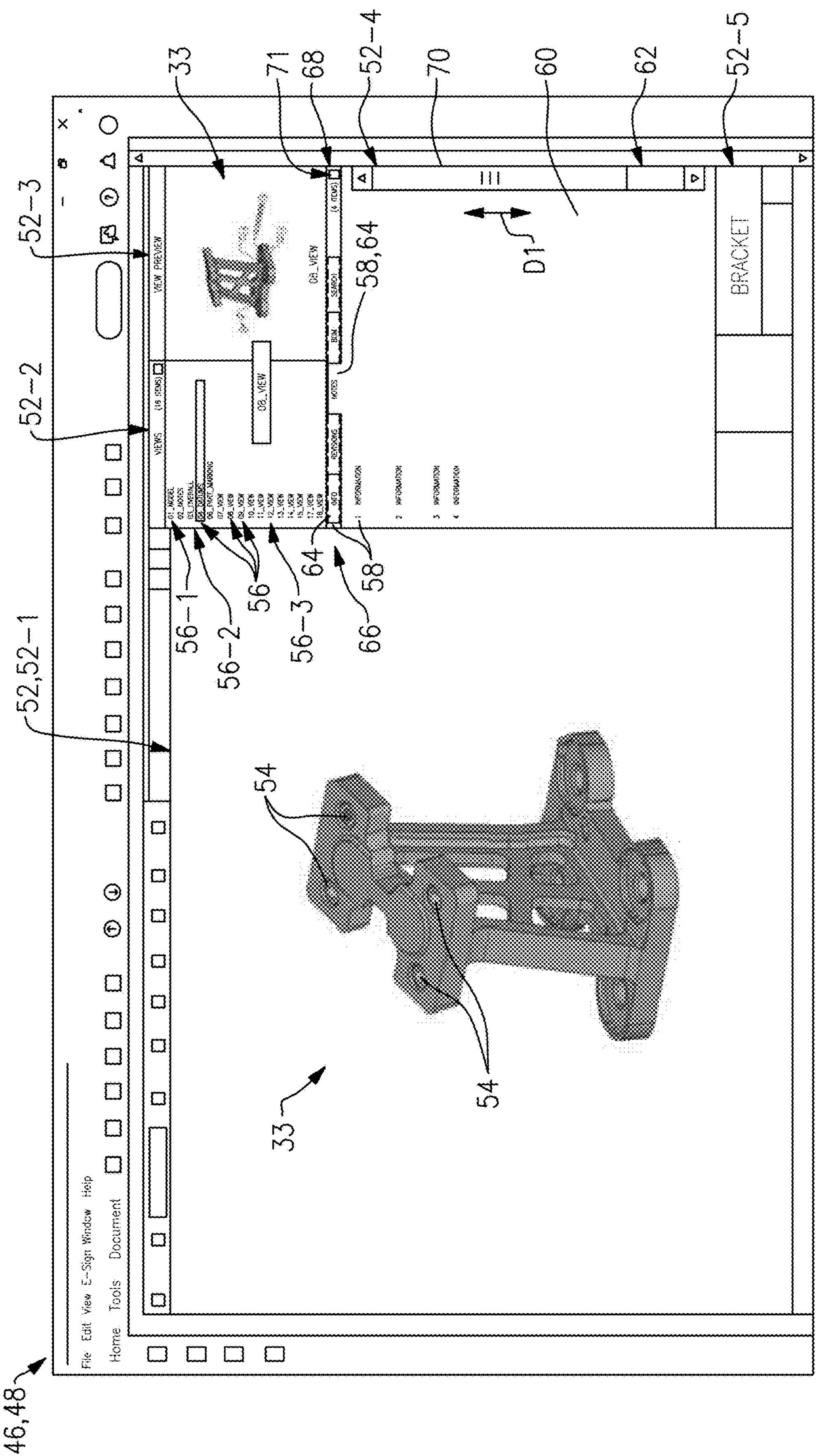
FIG. 4A discloses a graphical user interface for depicting geometry.

Referring to FIG. 4A, with continuing reference to FIGS. 1-3, the tessellated model 36 may establish a user interface 48. The user interface 48 may be suitable for a lightweight viewer, such as lightweight viewer 46, which may display the tessellated model 36 according to the API 50. FIG. 4A discloses an implementation of the lightweight viewer 46. The tessellated model 36 may include the tessellated geometry, information associated or presented with the tessellated geometry, and/or information utilized to establish the user interface 48.

The user interface 48 may be arranged in a manner that may declutter secondary information associated with the design geometry 33 such that a main viewing area may be relatively large. The user interface 48 may include one or more display windows 52 which may serve to divide the user interface 48 into different areas. In the implementation of FIG. 3, the display windows 52 may include a first (e.g., main) viewing window 52-1, a second (e.g., navigation) window 52-2, a third (e.g., preview) window 52-3, a fourth (e.g., information) window 52-4, and a fifth (e.g., information) window 52-5. The information window 52-4 may be a dynamic information window that may dynamically display information. The information may be contextual depending on what view the user may select. The information window 52-5 may be a persistent information window, which may always be visible in the user interface 48 and may display information without change. The information may include the title, part number, document number, etc. that may uniquely identify the design. Although the user interface 48 is shown with five display windows 52, it should be understood that fewer or more than five display windows 52 may be utilized in accordance with the teachings disclosed herein. The viewing window 52-1 and/or preview window 52-3 may be operable to display one or more depictions of the geometry 33. The windows 52-2, 52-4 and/or 52-5 may be operable to display various information relating to the geometry 33 and/or other aspects of the design. In implementations, the window(s) 52 may be operable to display information associated with one or more attributes (e.g., display properties) specified in the lightweight file 37. Attribute(s) may be associated with the geometry 33 and/or depictions (e.g., views) of the geometry 33, but some attribute(s) may be specified at a global (e.g., file) level. The attributes may be specified in a header of the file 37.

The modeling environment 28 may be operable to generate one or more geometric objects 54. The modeling environment 28 may be operable to generate a tessellated model 36 that includes the geometric object(s) 54. The geometric objects 54 may establish a tessellation of geometry 33 (see, e.g., FIG. 2). The viewing window 52-1, preview window 52-3 and/or another display window 52 may be operable to display geometry 33 established by one or more geometric objects 54 of the tessellated model 36. The geometric objects 54 may be operable to display various depictions of the tessellation of the geometry 33 in the viewing window 52-1 and/or another window 52 of the user interface 48. Each of the geometric objects 54 may be associated with one or more graphics that may depict a geometry of the design. The depictions may include two-dimensional and/or three-dimensional views of the geometry 33 and may include solids, wireframes, transparencies, etc. The modeling environment 28 may be operable to store the tessellated models 36 in one or more lightweight files 37, which may be readable by the lightweight viewer 46. In implementations, the file(s) 37 may exclude any CAD models 32, including any CAD models 32 utilized to establish, or that may otherwise be related to, tessellated model(s) 36 of the respective geometry 33. The modeling environment 28 may be operable to store code (e.g., scripts, function calls, etc.) in the lightweight file 37 that may be operable to cause one or more functions associated with the tessellated model 36 to execute in the lightweight viewer 46, including any of the functions disclosed herein.

The modeling environment 28 may be operable to generate one or more view objects 56. Each of the view objects 56 may be associated with respective depictions of the geometric object(s) 54 associated with the geometry 33. The view objects 56 may be associated with the navigation window 52-2 and/or another window 52 of the user interface 48. The navigation window 52-2 may be operable to display one or more of the view objects 56, which may be depicted in a list. The viewing window 52-1 may be operable to display the depiction in response to user interaction or selection of the respective view object 56.

Figure 7:
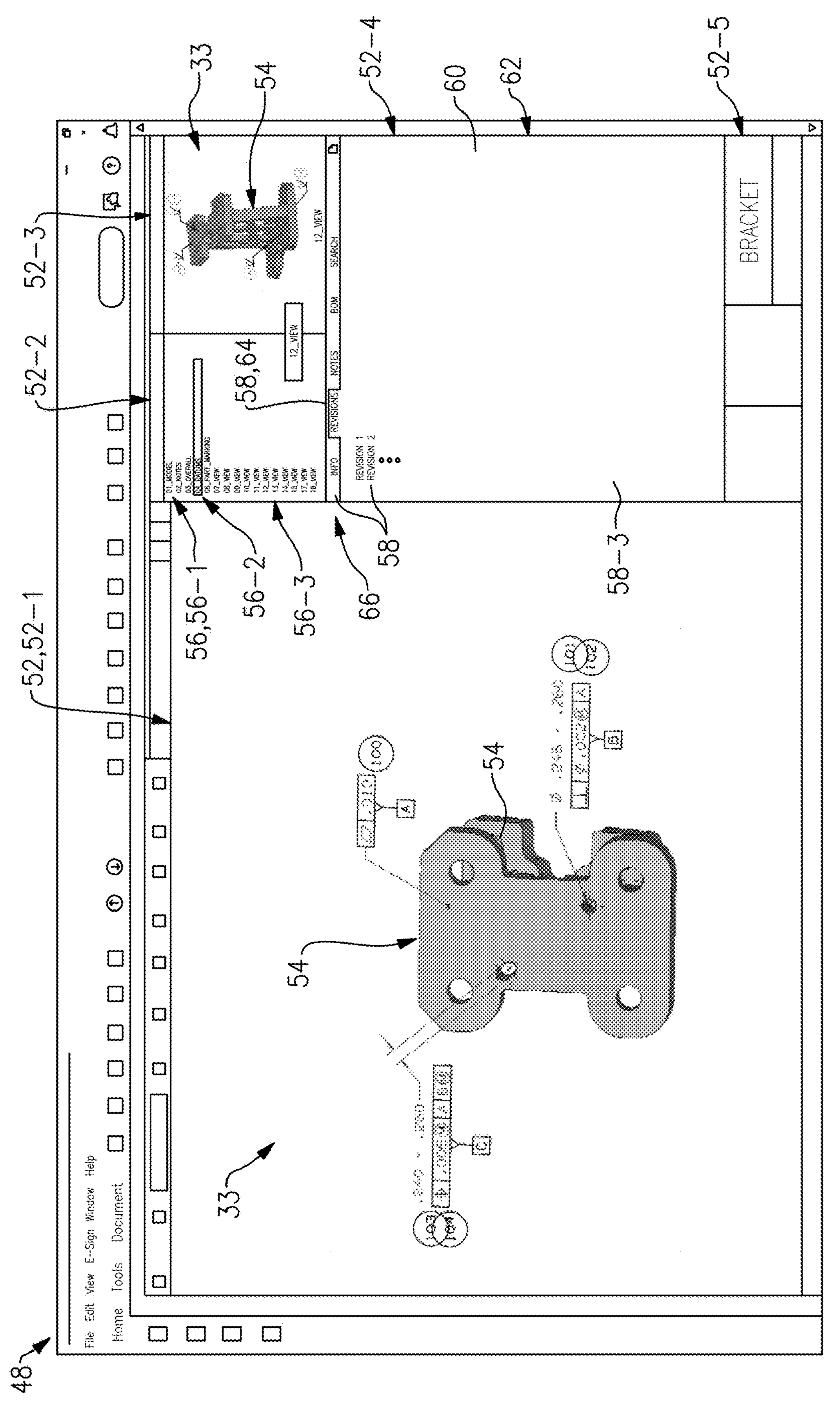
FIG. 7 discloses another depiction of the geometry in the user interface of FIG. 4A.

In implementations, the view objects 56 may include first, second, and third view objects 56-1 to 56-3. The view object 56-1 may be associated with an overall representation of the geometry 33. The second view object 56-2 may be associated with another depiction of the geometry 33, such as a depiction including one or more datums or other annotations (see, e.g., FIG. 7). The viewing window 52-1 may be operable to display the depiction of the geometry 33 in response to selection of the respective view object 56. The preview window 52-3 may be operable to display a depiction of the geometry 33 associated with the respective view object 56 in response to user interaction. In implementations, a user may interact with the user interface 48 by positioning a cursor on or otherwise adjacent to the view object 56 to cause the preview window 52-3 to display the respective depiction (e.g., preview) of the geometry 33, which may be displayed in the viewing window 52-1 in response to selection of the view object 56 (e.g., mouse click).

The information window 52-4 may be operable to display information in the user interface 48. The information may be generic and/or may be associated with the geometry 33. The information window 52-4 may be dynamically linked to one or more of the geometric objects 54 such that selection of the geometric object 54 may cause information to update in the information window 52-4.

The modeling environment 28 may be operable to generate one or more content objects 58. The tessellated model (s) 36 may include the content object(s) 58. The content object(s) 58 may be operable to establish the information window 52-4. The content objects 58 may be operable to selectively display information associated with the tessellated model 36 and/or respective geometry 33 in a common display region 62 and/or another portion of the user interface 48. The content objects 58 may be operable to establish the information window 52-4 such that the common display region 62 may be spaced apart from, but may be concurrently displayed with, the viewing window 52-1 in response to opening the tessellated model 36 in the lightweight viewer 46.

The content objects 58 may be assigned various information, including information associated with the tessellated model 36. The information may be assigned to content fields 59 associated with the respective content objects 58 (FIG. 3). In implementations, the content fields 59 may be associated with information specified in one or more data structures (e.g., templates) readable by the lightweight viewer 46. The lightweight file 37 may store the information in the data structure(s) according to the API 50. In other implementations, the information may be stored directly in the respective content fields 59. The content field 59 may be a portion of the content object 58 or may be another object linked to the content object 58. Various techniques may be utilized to define the information associated with the content fields 59, including various data types or structures such as character, string, integer, boolean, array, date, time, etc. In implementations, the content fields 59 may contain code (e.g., script), which may be executable by the API 50 and/or lightweight viewer 46. The information assigned to the content objects 58 may be the same or may at least partially differ from information assigned to other content objects 58. The information may be associated with various details of the organization responsible for the CAD model 32. The information may include a revision history of the CAD model 32, various notes or statements associated with the CAD model 32, a bill of material (BOM) associated with component(s) represented by the geometry 33, etc. The content objects 58 may be operable to display information assigned to the respective content field 59 in respective portions of the information window 52-4.

The modeling environment 28 may be operable to generate one or more content layers 60. The layers 60 may be respective objects of the tessellated model 36. Each content object 58 may be associated with one or more of the layers 60. The content objects 58 may be assigned (e.g., occupy) the same view location in the user interface 48 but may be assigned to different layers 60 of the model 36. At least some of the layers 60 may occupy the common display region 62 of the user interface 48. The layers 60 may be dimensioned to at least partially, substantially, or completely overlap with each other in the common display region 62. The content objects 58 may be operable to selectively display information associated with the tessellated model 36 in response to user interaction with or selection of the respective content object 58 such that the respective layer 60 may be activated, but a remainder of the layers 60 may be deactivated in the common display region 62.

Various techniques may be utilized to establish the layers 60 in the user interface 48. The modeling environment 28 may be operable to establish a tabbed interface 66. The tabbed interface 66 may be utilized to display information relating to the geometry 33 and/or other aspects of the tessellated model 36. Each viewable tab of the tabbed interface 66 may be established by at least two objects. One object may be associated with the tab name (e.g., tab object 64) and another object may be associated with the respective information area (e.g., content object 58). The user may interact with a control object 71 in the user interface 48 to open a separate document containing a full listing of applicable tabs. Prior systems may include a model tree window having one or more tabs for displaying various information, such as a model tree, model views, product manufacturing information (PMI), etc., specified in a data stack. However, the model tree window may be provided by the application itself independent of any particular lightweight file, instead of being established by objects stored in the lightweight file.

The modeling environment 28 may be operable to generate one or more tab objects 64. The tessellated model 36 may include the tab objects 64. The information window 52-4 may be established by the tab object(s) 64 and control objects 58. The tab objects 64 may be operable to graphically depict the tabbed interface 66 in the information window 52-4 or another portion of the user interface 48. The tab objects 64 may be arranged in an array to graphically depict the tabbed interface 66. The tab objects 64 may be arranged in a row or may otherwise be offset from each other. The tabbed interface 66 may be directly adjacent to the common display region 62. The tab objects 64 may be associated with one or more content objects 58. Each tab object 64 may be associated with a respective layer 60 and one or more content objects 58 assigned to the layer 60. Each of the layers 60 and/or respective tab objects 64 may be associated with an activated state and a deactivated state. The tab objects 64 may be operable to graphically depict the current states in the user interface 48. The layers 60 may be made visible or invisible based on selection of the tab object 64. One layer 60 may be selectively visible at a time. Each of the tab objects 64 may be operable to selectively activate the layer 60 of the respective content object(s) 58 and deactivate a remainder of the layers 60 associated with the information window 52-4 in response to user interaction or other selection of the respective tab object 64.

Figure 5:
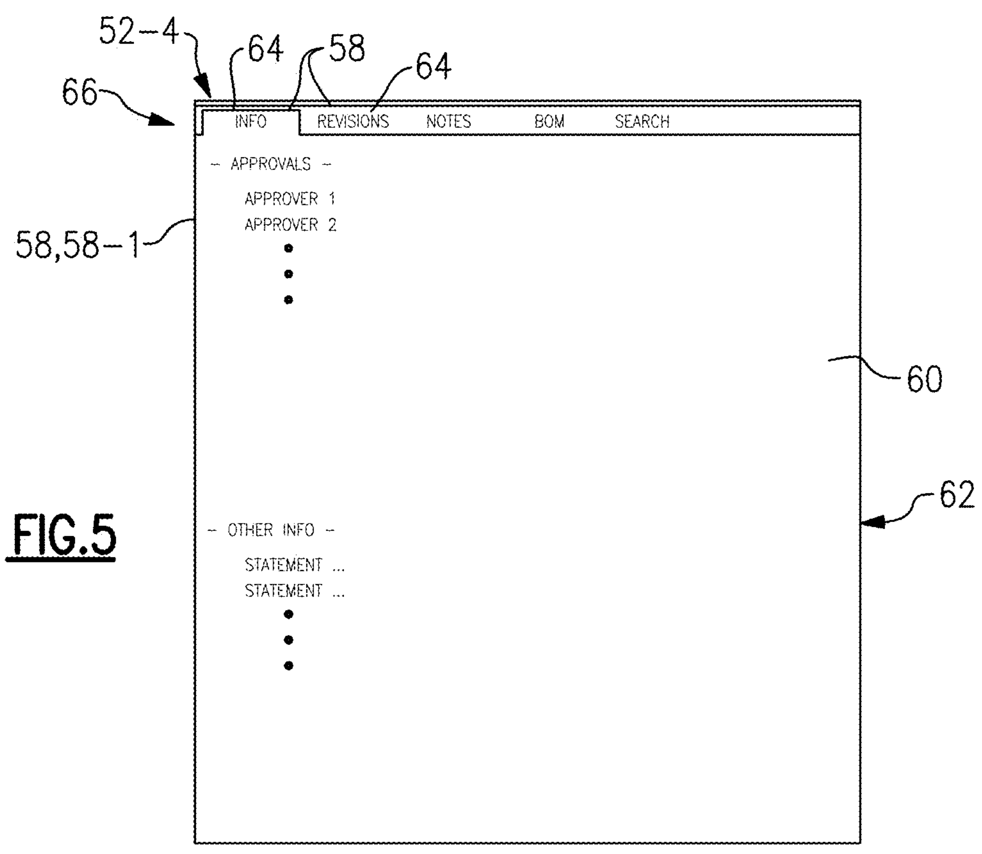
FIG. 5 discloses an arrangement of the user interface of FIG. 4A.

In the implementation of FIG. 5, the content objects 58 may include a first content object 58-1. The content object 58-1 may be associated with various information relating to personnel(s) and/or organization(s) assigned to designing, reviewing, manufacturing, etc., of the component(s), assembly or system.

Figure 6:
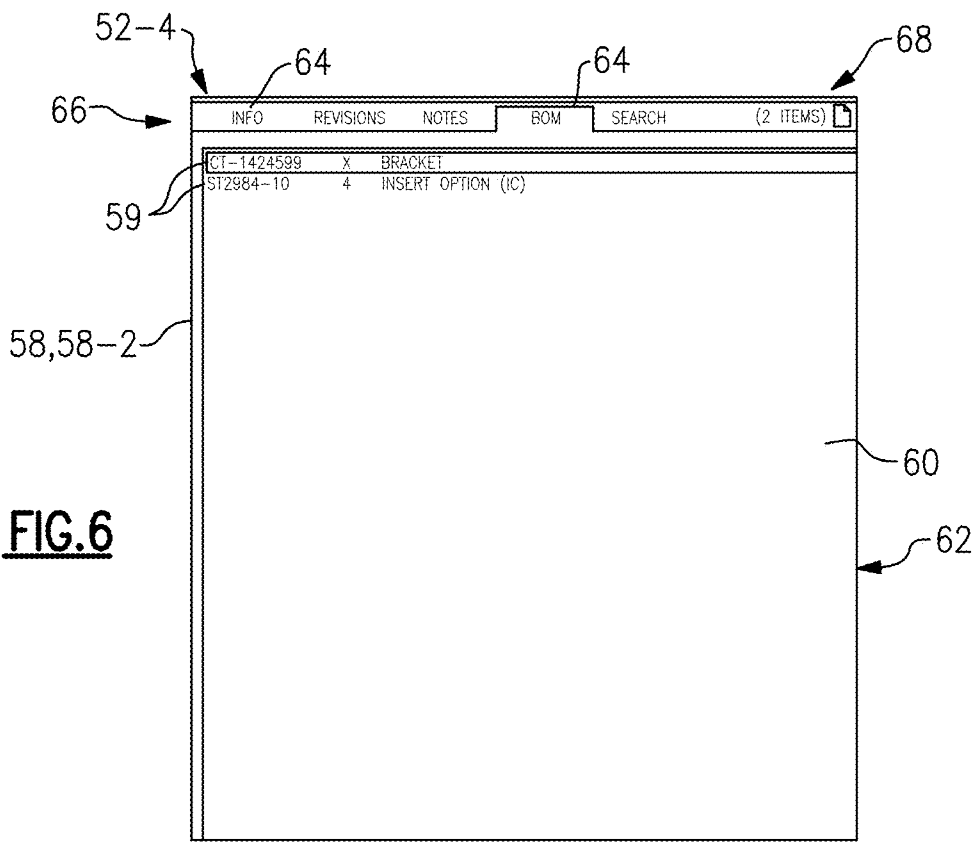
FIG. 6 discloses another arrangement of the user interface of FIG. 4A.

The modeling environment 28 may be operable to dynamically link one or more of the content objects 58 to one or more of the view objects 56 such that contents of a list or other information assigned to the content objects 58 may update in response to user interaction with or selection of the respective view objects 56. One or more of the content objects 58 may be dynamically linked to one or more of the view objects 56 such that the content fields 59 and/or other information assigned to the respective content objects 58 may update in response to selection of the respective view object 56. In the implementation of FIG. 6, the content objects 58 may include a second content object 58-2. The second content object 58-2 may be operable to display a bill of material (BOM) associated with the design. The content fields 59 of the associated content object 58-2 may be depicted graphically as a list. In implementations, the list may be an interactive list. The content fields 59 associated with the respective content object 58-2 may be dynamically linked to one or more of the respective view objects 56.

Figure 4B:
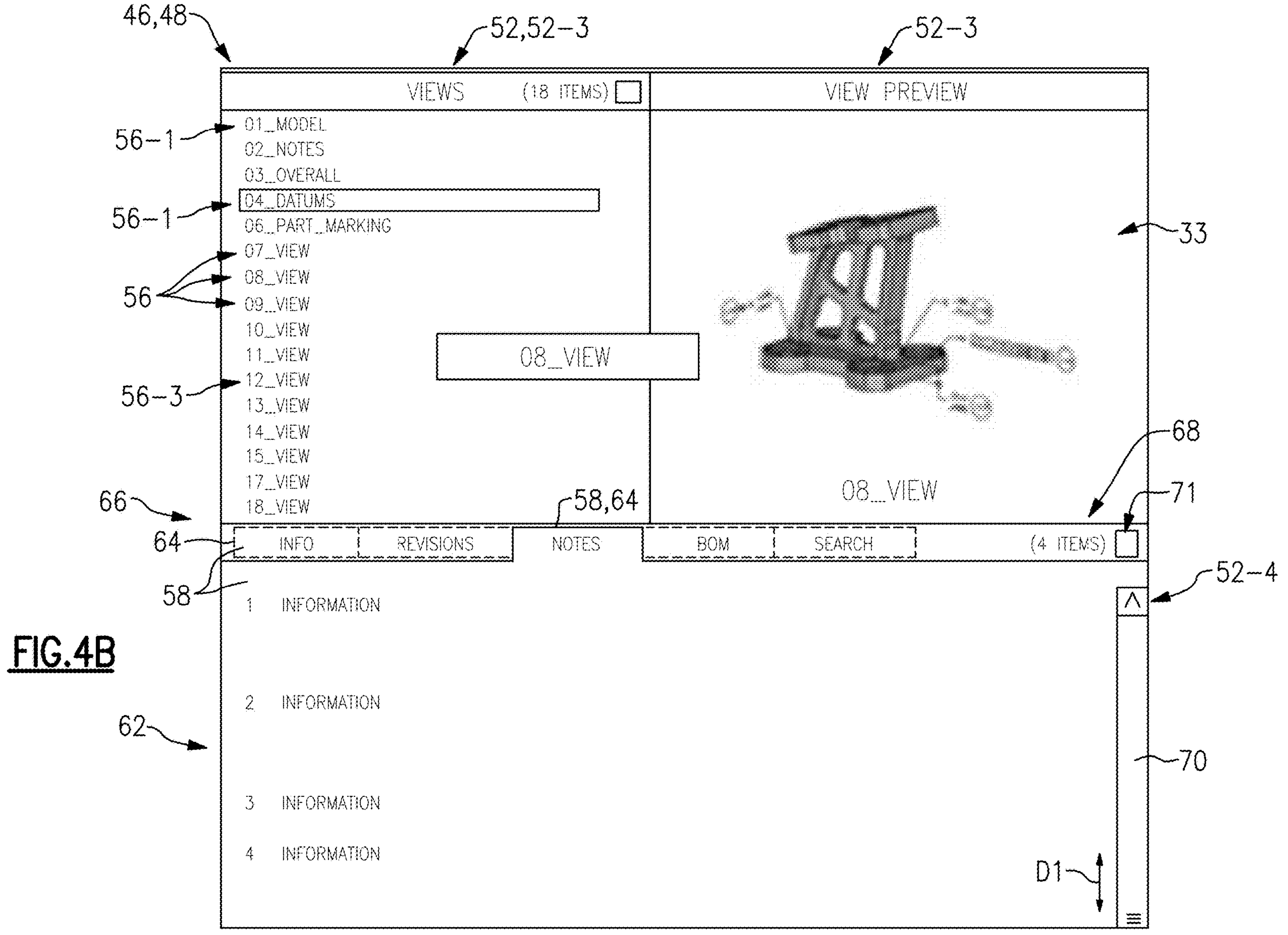
FIG. 4B discloses selected portions of the user interface of FIG. 4A.

Selection of a respective view object 56 from the navigation window 52-2 may cause the interactive list to update such that content of the content fields 59 associated with the respective content object 58 may be displayed in the common display region 62 according to the selected view object 56. The content displayed in the list may include unique identifiers (e.g., part numbers, names, descriptions, etc.) assigned to the associated geometric objects 54 and related information (see, e.g., FIGS. 4A-4B). In implementations, the content object 58-2 may include a content field associated with each of the respective geometric objects 54. The content object 58-2 may be operable to selective display of content in the content fields 59 in response to selection of the respective view object 56.

The information displayed in the information window 52-4 may include one or more statements. The statements may be established by one or more respective content fields 59. The content objects 58 may be operable to establish a list associated with a quantity of the statements assigned to the content fields 59 of the respective content object 58.

Each tab may be associated with a counter. The content objects 58 may be associated with a counter object 68 that may establish the counter. The counter object 68 may be arranged adjacent to the common display region 62. The counter object 68 may be operable to indicate a quantity of the statements assigned to the respective content objects 58 that may be currently indicated in the list.

Referring back to FIGS. 4A-4B, each tab may be associated with a control object 70 for interacting with information in the tabbed interface 66. The user may interact with the control object 70 to view the associated information, which may be useful in decluttering the information window 52-4 by reducing the size of the information area. One or more of the content objects 58 may be associated with the control object 70. The control object 70 may be adjacent to the common display region 62. The tessellated model 36 may include the control object 70. The control object 70 may be operable to cause a visible portion of the activated layer 60 to vary in response to user interaction. The control object 70 may be a scroll bar object. The scroll bar object 70 may be moveable in direction D1. The scroll bar object 70 may be manipulated by the user to view information displayed in the common display region 62. The counter object 68 may indicate that more items are available, which may be useful by suggesting that the user may interact with the scroll bar object 70 to view the additional information.

Figure 8:
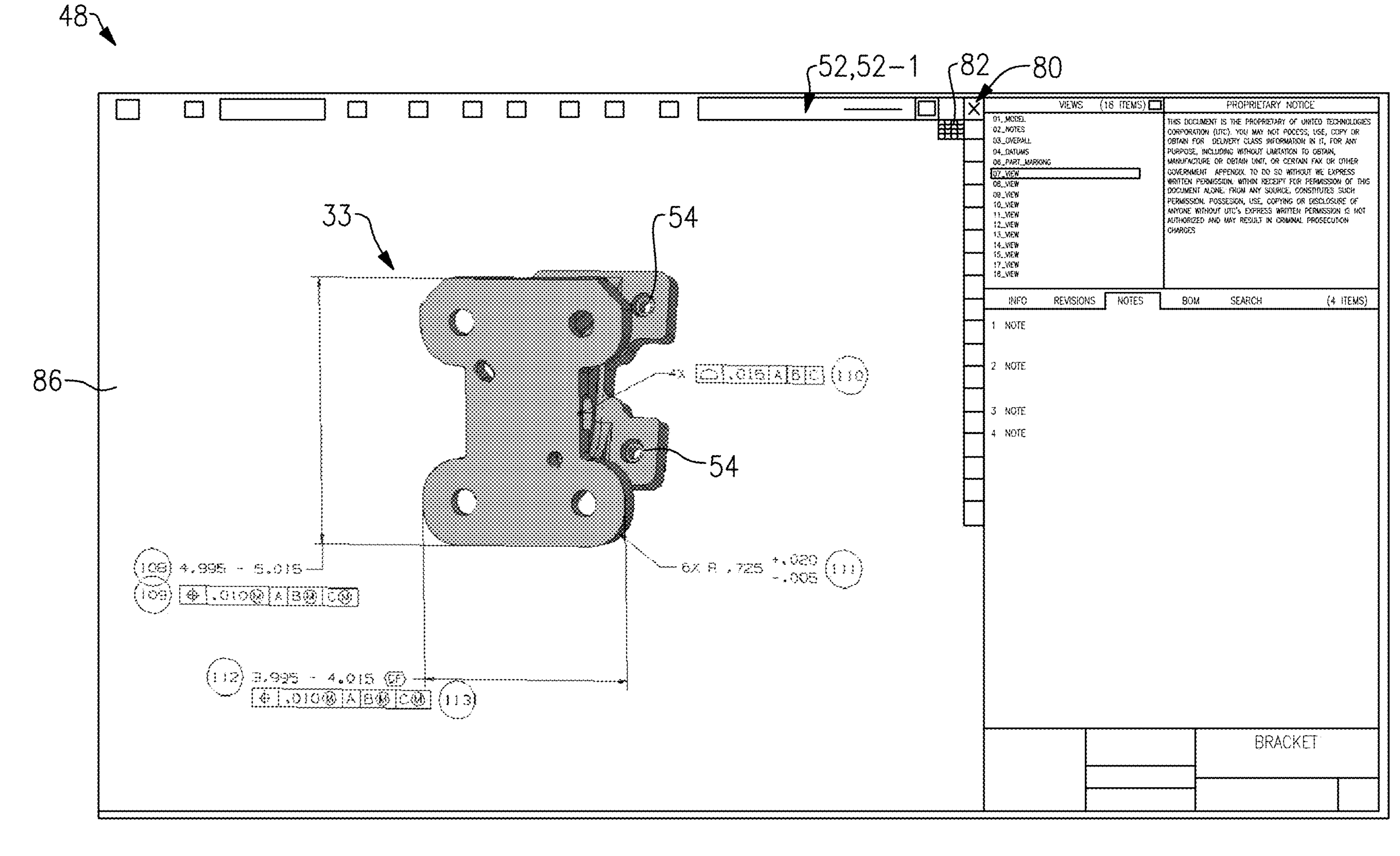
FIG. 8 discloses the user interface including a set of tools.
Figure 9:
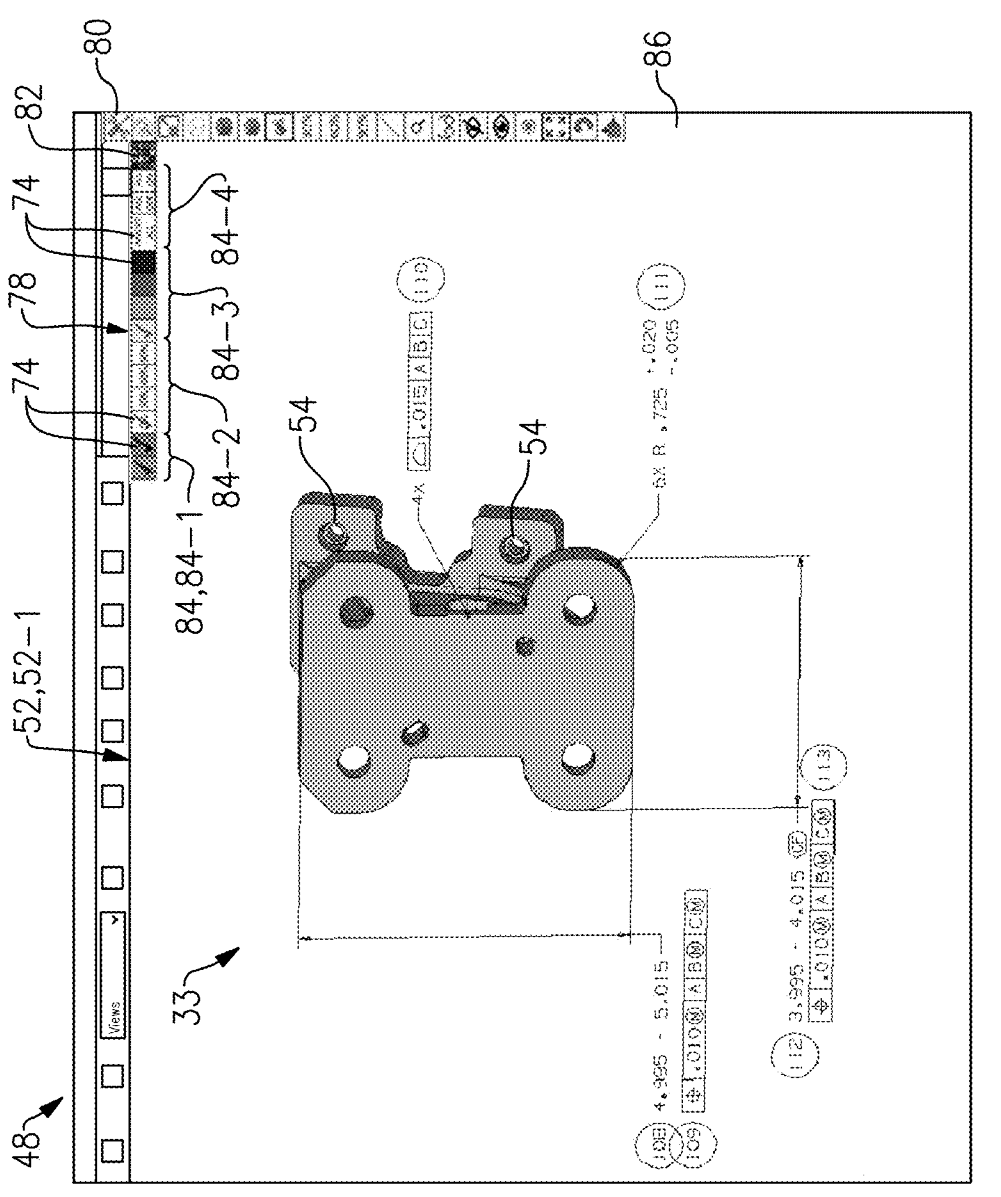
FIG. 9 discloses the user interface of FIG. 8 including a palette menu.

Referring to FIGS. 3 and 8-9, with continuing reference to FIG. 1, each of the geometric objects 54 may include one or more visual attributes (e.g., display properties) 72 that may visually depict aspects the geometry 33. Utilizing the techniques disclosed herein, the visual attributes 72 may be established to provide targeted display of the geometry 33 in the user interface 48. The user may interact with a palette menu 78 to change one or more visual attributes 72 of the graphical objects 54 in a targeted and/or global manner. The user may interact with the palette menu 78 to change attribute(s) of a targeted object 54, while a reminder of the graphical objects 54 may remain unchanged. The user may interact with the palette menu 78 to turn on and off any and/or all of the colors of the model 36. The user may interact with the palette menu 78 to change the transparency and/or contrast of the selected object 54 (e.g., after reverting back to a base color if the user previously turned off the base color). The palette menu 78 may be arranged in any position of the display window 52 and/or user interface 48. The user may interact with the palette menu 78 and/or another portion of the user interface 48 to save the specified palette settings associated with the model 36. The specified settings may include settings associated with specific view(s) and/or object type(s). The stored settings may be pinned to the palette menu 78 for selection.

The visual attributes (e.g., display properties) 72 may be associated with one or more visual attribute types. The visual attribute types may include a color attribute type and/or transparency attribute type. The color attribute type may include contrast. In other implementations, the visual attribute types may include a contrast attribute type. The color attribute type may be associated with a color model, such as the Red-Green-Blue (RGB) color model. A distinct set of colors and contrasts may be defined by respective values of the RGB color model. Other attribute types may include luminescence, opacity, diffusion, etc.

Various techniques may be utilized to associate the geometric objects 54 with the visual attributes 72. Each geometry object 54 may be linked to or otherwise associated with a respective set of the attributes 72 associated with the respective attribute types. In implementations, the tessellated model 36 may be associated with one or more materials 73. The material 73 may be a set of visual attributes 72. The modeling environment 28 may be operable to define a set of materials 73 for the tessellated model 36. The set of materials 73 may be associated with values of the attributes of the associated CAD model 32 such that the geometry 33 may be depicted in the user interface 48 in a similar manner as the user interface 34 of the CAD system 30 (e.g., same color, transparency, etc.) when the respective material is active. Each material may be defined by values of a group of the attributes 72 (e.g., color, transparency level, luminescence, etc.). The materials 73 may be stored in the tessellated model 36 according to data structure(s) specified by the API 50. The lightweight viewer 46 may be operable to establish a palette of the materials 73. The lightweight viewer 46 may be operable to depict the geometric objects 54 according to the associated materials 73 when selectively activated. The lightweight viewer 46 may be operable to store the set of materials 73 of the tessellated model 36 in a material register or dataset.

Each geometric object 54 may establish one or more faces. The faces may be established by the tessellation of the geometry 33. Each of the faces may be associated with a respective set of the attributes 72. In implementations, the faces may be objects linked to the respective geometric object 54. The attributes 72 of the faces may be the same or may differ from each other. Each of the faces of the geometric object 54 may be associated with a material 73. The display window 52 may be operable to display the faces of the geometric objects 54 according to the respective materials 73. Two or more of the geometric objects 54 may be associated with a common material 73 such that the objects 54 may be visually depicted in the same manner (e.g., same color, transparency, etc.) when the material 73 is active, which may improve compactness of the tessellated file 37. In implementations, when the modeling environment 28 tessellates the CAD model 32, each face of the tessellation may inherit the attributes (e.g., properties) of the face of the CAD model 30 it was generated from. Each facet of the tessellation may point to the set of attributes of the respective face. Default values of the attributes 72 may be stored in the tessellated model 36. The default values may be associated with values of the attributes of the geometry 33 in the CAD model 32 when the tessellated model 36 is established. The default values may establish a first (e.g., color) mode of the geometric objects 54.

Other techniques may be utilized to associate the geometric objects 54 with the visual attributes 72. The visual attributes 72 may be assigned to fields of the geometric object 54 such that activation and/or modification of an attribute 72 may cause a visual depiction of the geometric object 54 to change in the view window 52-1 according to the attribute 72. One or more fields of the geometric object 54 may be utilized to assign value(s) of the visual attribute 72 of the respective visual attribute type such that the geometric object 54 may be depicted according to the assigned visual attribute. The fields may be operable to store default and modified values of the respective attribute 72, which may be associated with different (e.g., first and second) modes of the geometric object 54. Interaction with the palette menu 78 may cause the depiction of the geometric object 54 to change according to the values based on the activated mode.

The modeling environment 28 may be operable to generate one or more menu objects 74 for depicting the palette menu 78 in the user interface 48 (FIG. 9). Menu object(s) 74 of the tessellated model 36 may be operable to establish the palette menu 78. Each of the menu objects 74 may be associated with one or more of the geometric objects 54. The modeling environment 28 may be operable to assign respective visual attribute settings 76 to the respective menu objects 74 (FIG. 3). The modeling environment 28 may be operable to generate one or more tessellated models 36 that may include the geometric object(s) 54, menu object(s) 74 and visual attribute settings 76.

The menu objects 74 may be operable to cause the viewing window 52-1 to depict the respective geometric object(s) 54 according to the respective visual attribute settings 76 in response to user interaction with the palette menu 78. Each menu object 74 may be linked to one or more of the geometric objects 54 such that selection of the menu object 74 may cause a depiction of the geometric object 54 to change in the viewing window 52-1 according to the specified visual attribute 72 associated with the menu object 74. The menu objects 74 may be linked to or otherwise associated with one or more of the geometric objects 54 such that selection of the menu object 74 may cause at least one or more visual attributes 72 of the associated geometric objects 54 to update according to respective visual attribute setting 76. In implementations, selection of the menu object 74 may cause one or more values of a respective material to change according to the respective visual attribute setting(s) 76.

The modeling environment 28 may be operable to establish one or more control objects for accessing various tools and functionality of the user interface 48. The modeling environment 28 may be operable to establish a tool control object 80. The tool control object 80 may be operable to display the palette menu 78 and/or other tools in response to selection of the tool control object 70. The modeling environment 28 may be operable to establish a palette control object 82. The palette control object 82 may be operable to activate and deactivate the palette menu 78. The palette menu 78 may be selectively displayed in a portion of a display region 86 that may be common with the viewing windows 82-1 in response to user interaction with the palette control object 82.

The menu objects 74 may be arranged to establish the palette menu 78 utilizing various techniques. In the implementation of FIG. 9, the menu objects 74 may be arranged in an array adjacent to the viewing window 52-1. FIG. 13 discloses another arrangement of a palette menu 178.

The palette menu 78 may include one or more sets 84 of menu objects 74. The menu objects 74 of each respective set 84 may be assigned different visual attribute settings 76 associated with a common visual attribute type or component of the visual attribute type (e.g., color, transparency, and/or contrast). In the implementation of FIG. 9, the palette menu 78 may be established by four sets 84-1 to 84-4 of menu objects 74.

The palette menu 78 may be operable to display all colors and/or materials 73 associated with the model 36 (e.g., orange and purple). The first set 84-1 of menu objects 74 may be associated with the color attribute type and/or group of materials 73. The modeling environment 28 may be operable to establish a menu object 74 representative of each distinct color and/or material 73 assigned to the geometric objects 54 of the model 36. The colors may be associated with a color attribute type. Color attributes 72 may be assigned or otherwise associated with the colors. In the implementation of FIG. 9, the geometric objects 54 may be associated with two different colors (e.g., orange and purple). Each geometric object 54 or group of geometric objects 54 may be assigned a respective color for distinguishing between different geometric objects 54 displayed in the viewing window 52-1. The visual attribute settings 76 may include the respective colors. In implementations, the first set 84-1 may include menu objects 74 associated with the respective default values of the materials 73 of the tessellated model 36. The default material values may establish a first (e.g., color) mode of the geometric object(s) 54. The geometric object(s) 54 may be associated with a different set of values of the attributes 72 to establish a second (e.g., base) mode. The base mode may be associated with a grayscale depiction of the geometric object(s) 54 at a specified contrast and/or transparency. The grayscale depiction may be established by assigned RGB values. Each facet establishing a face of the geometric object 54 may point to or otherwise be associated with a respective material 73. The menu objects 74 may be operable to edit the present values of the respective materials 73 of the tessellated model 36 in the material register or dataset to cause the lightweight viewer 46 to depict the geometric object(s) 54 in the user interface 48 according to the edited values.

In implementations, one or more of the menu objects 74 may be operable to toggle between activation of at least two of the visual attribute settings 76, which may be associated with the same visual attribute type, in response to user interaction with the palette menu 78. Selection and deselection of the menu objects 74 from the first set 84-1 may cause the respective object(s) 54 to toggle between the color mode and base mode. The palette menu 78 may be operable to copy the default values and base values of the materials 73 to separate data arrays prior to changing between the color mode and the base mode. The palette menu 78 may be operable to change present value(s) of the materials 73 in the material register between the color and base mode values to depict the respective object(s) 54 in the user interface 48. The palette menu 78 may be operable to change the base mode value(s) to the value assigned to the visual attribute setting(s) 76 in response to selection of the respective menu object 74. In other implementations, any changes to the base mode value(s) may be discarded when changing from the base mode to the color mode.

The second set 84-2 of menu objects 74 may be associated with the transparency attribute type. The modeling environment 28 may be operable to establish menu objects 74 representative of a set of distinct transparency levels assigned to the geometric objects 54 of the model 36. The transparency attributes 72 may be assigned or otherwise associated with the transparency levels. The modeling environment 28 may be operable to establish respective menu objects 74 associated with the respective transparency levels. In the implementation of FIG. 9 (see also FIGS. 10-12), the visual attribute settings 76 of the menu objects 74 may be respectively assigned 0%, 30%, 60%, and 90% transparency levels, although other transparency levels may be utilized. The palette menu 78 may be operable to change the present value(s) of the material(s) 73 from the base mode value(s) to depict the respective object(s) 54 in the user interface 48 when in the base mode according to the transparency level associated with the visual attribute setting 76 of the selected menu object 74.

The third set 84-3 of menu objects 74 may be associated with one or more contrasts associated with the color attribute type and/or a separate contrast attribute type. The modeling environment 28 may be operable to establish menu objects 74 representative of a set of distinct contrast levels assigned to the geometric objects 54. The contrast attributes 72 may be assigned or otherwise associated with the contrast levels. In the implementation of FIG. 9 (see also FIGS. 10-12), the visual attribute settings 76 of the menu objects 74 may be respectively assigned four different contrast levels (e.g., in grayscale), although other contrast levels may be utilized. The palette menu 78 may be operable to change the present value(s) of the material(s) 73 from the base mode value(s) to depict the respective object(s) 54 in the user interface 48 when in the base mode according to the contrast level associated with the visual attribute setting 76 of the selected menu object 74.

The fourth set 84-4 may be utilized to apply various global settings associated with the visual attributes 72 of the geometric objects 54. In the implementation of FIG. 9 (see also FIGS. 10-12), the fourth set 84-4 may include an "invert all" menu object 74, an "all off" menu object 74 and/or an "all on" menu object 74. The invert all menu object 74 may be operable to the cause the geometric objects 54 to individually toggle between the color mode and the base mode (e.g., color and grayscale depictions of geometric object 54-1 in FIGS. 9 and 10). Selection of the invert all menu object 74 may cause any geometric objects 54 in the color mode to change to the base mode and may cause any geometric objects 54 in the base mode to change to the color mode.

The all on object 74 may be operable to cause the geometric objects 54 to collectively enter the color mode. The all off menu object 74 may be operable to cause the geometric objects 54 to collectively enter the base mode, which may be associated with different values of the visual attributes 72 than the color mode. The all on object 74 may be operable to cause all geometric objects 54 to be displayed in the viewing window 52-1 according to the color mode values. In the implementation of FIG. 9 (see also FIGS. 10-12), the all off object 74 may be operable to cause all geometric objects 54 to be displayed in the viewing window 52-1 according to the (e.g., previously stored) base mode values. The all on menu object 74 may be operable to depict geometric objects 54 according to the (e.g., previously stored) color mode values.

The sets 84 of menu objects 74, or at least some of the menu objects 74, may be established according to a hierarchy. Selection of one of the menu objects 74 at a relatively higher level of the hierarchy may cause the respective geometric object(s) 54 to be displayed in the viewing window 52-1 according to the respective visual attribute setting(s) 76 and may block activation of the visual attribute setting(s) 76 associated with any menu object(s) 74 at a relatively lower level of the hierarchy when the menu object 74 at the relatively higher level is active. In implementations, the first set 84-1 of menu objects 74 associated with the color mode may be relatively higher in the hierarchy than other menu objects 74 associated with the base mode, such as the second set 84-2 of menu objects 74 (e.g., transparency levels) and/or the third set 84-3 of menu objects 74 (e.g., contrast levels). In implementations, selection of any menu object 74 at the lower level(s) of the hierarchy when the relatively higher menu object 74 is active may cause the base value(s) to update according to the respective visual attribute setting(s) 76 of the relatively lower menu object 74 for later depiction when entering into the base mode.

In the implementation of FIGS. 8-9, the geometric objects 54 are displayed in the default (e.g., color) mode. In the implementation of FIG. 10, the color mode of a first geometric object 54-1 may be deactivated and the base mode may be activated. The base mode may be associated with a transparency level (e.g., 0% level) and/or contrast level (e.g., light gray) specified by the respective visual attribute settings 76. In the implementation of FIG. 11, a different transparency level (e.g., 60% level) of the first geometric object 54-1 may be set in response to selection of the respective menu object 74. In the implementation of FIG. 12, a different contrast (e.g., medium gray) of the first geometric object 54-1 may be set according to respective visual attribute settings 76 in response to selection of the respective menu object 74.

Figure 14:
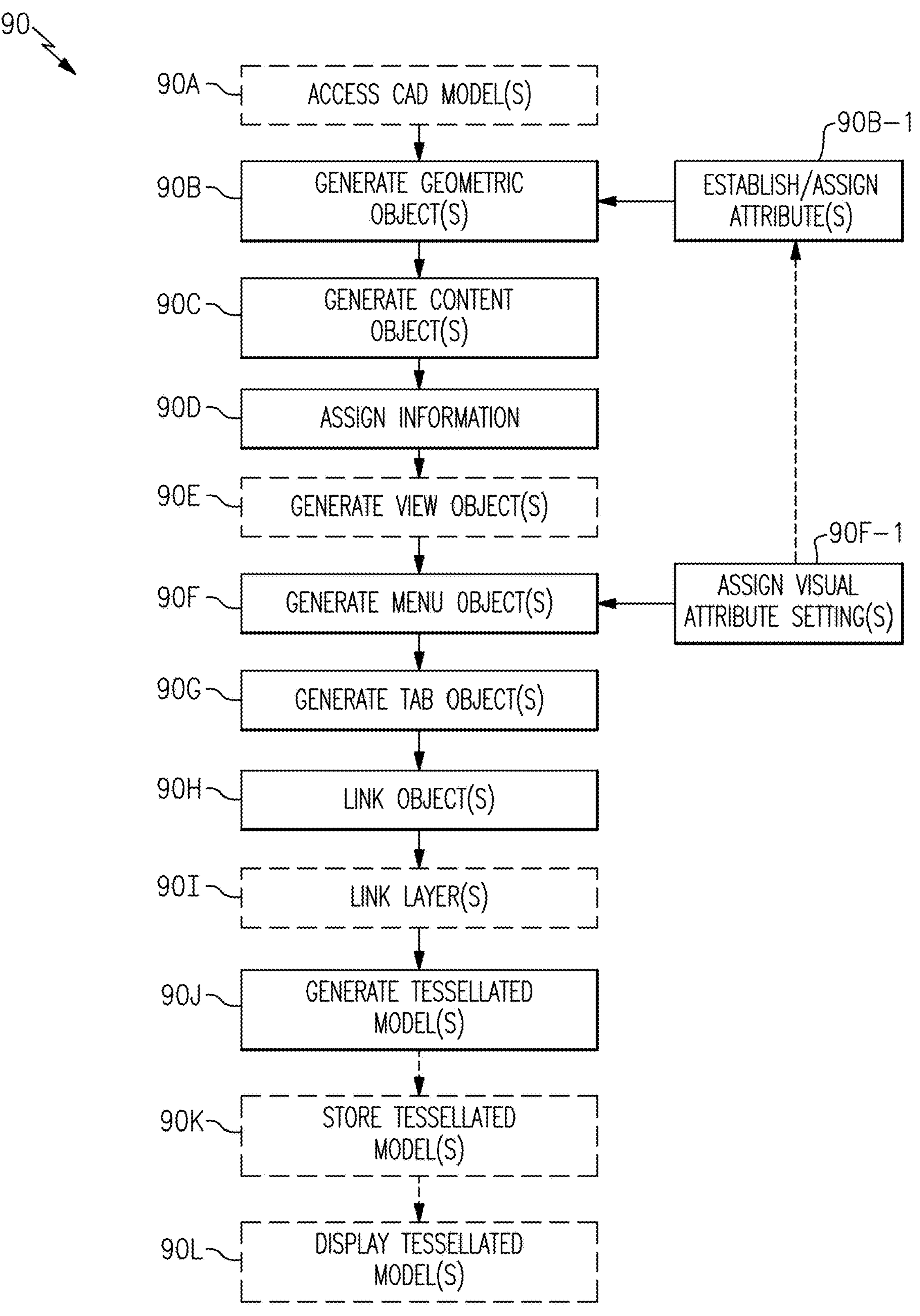
FIG. 14 discloses a method of generating a tessellated model.

FIG. 14 discloses a method of establishing and/or interacting with a tessellated model in a flow chart 90 according to an implementation. The method 90 may be utilized to generate one or more tessellated models associated with design geometry. The geometry may be defined in one or more associated CAD models. The tessellated models may exclude any CAD models associated with the geometry. Fewer or additional steps than are recited below could be performed within the scope of this disclosure, and the recited order of steps is not intended to limit this disclosure. The modeling environment 28 may be programmed with logic for performing method 90. Reference is made to the system 20.

Referring to FIG. 1, with continuing reference to FIG. 14, one or more CAD models 32 may be accessed at step 90A. The CAD model 32 may be associated with respective geometry 33. A CAD system 30 may be utilized to define the geometry 33 in the CAD model 32.

Referring to FIGS. 2-4A, with continuing reference to FIGS. 1 and 14, one or more geometric objects 54 may be generated at step 90B. The geometric objects 54 may establish a tessellation of the geometry 33, which may be stored in a tessellated model 36. The geometric objects 54 may be operable to display the tessellation of geometry 33 in the viewing window 52-1 and/or another display window 52 of the user interface 48.

Generating the geometric objects 90B may include establishing one or more visual attributes (e.g., display properties) 72 that may depict the respective geometry 33 at step 90B-1. Step 90B-1 may include assigning respective attributes 72 associated with respective visual attribute types (e.g., color, transparency, and or contrast). Step 90B-1 may include establishing a set of materials 73 associated with respective combinations of values of the attributes 72.

Referring to FIGS. 3-4, with continuing reference to FIGS. 1 and 14, one or more content objects 58 may be generated at step 90C. The content objects 58 may be operable to establish the information window 52-4 of the user interface 48. Step 90C may include associating the content objects 58 with respective layers 60 that may occupy the common display region 62 of the user interface 48. The content objects 58 may be operable to establish the information window 52-4 such that the common display region 62 may be spaced apart from, but may be concurrently displayed with, the viewing window 52-1 in the user interface 48.

At step 90D, information associated with the geometry 33 and/or other information may be assigned to the content objects 58. In implementations, the information may be stored in one or more content fields 59. The information may be displayed utilizing any techniques disclosed herein. The content objects 58 may be operable to selectively display the respective information in the common display region 62 of the user interface 48.

At step 90E, one or more view objects 56 may be generated. The view objects 56 may be associated with respective depictions of the geometry 33.

At step 90F, one or more menu objects 74 may be generated. The menu objects may be associated with one or more respective geometric objects 54. The menu objects 74 may be operable to establish a palette menu 78 in the user interface 48. Generating the menu objects 74 at step 90F may include assigning respective visual attribute settings 76 to the menu objects 74 at step 90F-1. The menu objects 74 may be operable to cause the viewing window 52-1 to depict the respective geometric objects 54 according to the respective visual attribute settings 76 in response to user interaction or selection. In implementations, the menu objects 74 may be operable to assign respective attributes 72 according to the visual attribute setting 76. Generating the tessellated model 36 at step 90J may include generating the tessellated model 36 to include the geometric objects 54, attributes 72, menu objects 74 and/or visual attribute settings 76. Generating the menu objects at step 90F may occur such that the palette menu 78 may be operable to display one or more sets 84 of menu objects 74, which may be associated with respective sets of colors, contrast levels, and/or transparency levels associated with respective visual attribute types. The menu objects 74 may be established according to a hierarchy such that selection of a menu object 74 relatively higher in the hierarchy may block application of visual attribute settings 76 associated with any lesser menu object(s) 74 in the hierarchy to the respective geometric object(s) 54 prior to deactivation of the higher menu object 74, but may permit application of the visual attribute settings 76 associated with the lesser menu object(s) 74 subsequent to deactivation of the higher menu object 74.

At step 90G, one or more tab objects 64 may be generated. The tab objects 64 may be operable to depict the tabbed interface 66 in the information window 52-4. Each tab object 64 may be associated with one or more of the content objects 58.

At step 90H, one or more of the objects may be linked to other object(s) of the tessellated model 36, including any of the objects disclosed herein. The objects may include the geometric objects 54, view objects 56, content objects 58, tab objects 64, counter objects 68, control objects 70, 80 and/or 82, visual attributes 72, menu objects 74, and/or visual attribute settings 76.

At step 90I, one or more of the objects may be linked to one or more respective layers 60. Each of the tab objects 64 may be operable to selectively activate the layer 60 of the respective content object(s) 58 and deactivate the remainder of the layers 60 associated with the information window 52-4 and/or another portion of the user interface 48 in response to user interaction with or selection of the respective tab object 64.

At step 90J, one or more tessellated models 36 may be generated. The tessellated models 36 may be generated utilizing any of the techniques disclosed herein. The tessellated model 36 may include any of the objects and features disclosed herein, such as the geometric objects 54, view objects 56, content objects 58, tab objects 64, counter objects 68, control objects 70, 80 and/or 82, visual attributes 72, menu objects 74, and/or visual attribute settings 76.

Linking the objects at step 90H may include dynamically linking one or more of the content objects 58 to one or more of the view objects 56 such that the information assigned to the respective content object 58 may update in response to user action with the respective view object 56. In implementations, the content objects 58 may be operable to display a list of the information which may be dynamically updated in response to selection of the view object 56. The visual attribute settings 76 and associated menu objects 74 may be dynamically linked to the visual attributes 72 and associated geometric objects 72 such that selection of the visual attribute settings 76 may cause the visual attributes 72 to update according to the respective visual attribute settings 76.

At step 90K, the tessellated model(s) 36 may be stored in one or more lightweight files 37. The files 37 may exclude the CAD model(s) 32 associated with the respective geometry 33.

At step 90L, the tessellated model(s) 36 may be displayed in a lightweight viewer 46. Step 90L may include establishing the user interface 48 in the display according to the objects of the tessellated model 36. The tessellated model 36 may cause the lightweight viewer 46 to execute code including one or more scripts, which may be specified in the content fields 59 of the content objects 58 or may otherwise be embedded in the tessellated model 36. Step 90L may include displaying one or more depictions of the geometry 33 in the display window(s) 52.

The systems and methods disclosed herein may be utilized to generate tessellated models associated with geometry of one or more components, assemblies and/or systems. The tessellated models may be stored in relatively compact files, which may be readable by a lightweight viewer provided to users who may not have access to a CAD system. The systems and methods disclosed herein may be utilized to establish a palette menu. The user may interact with the palette menu to apply targeted color, transparencies, contrasts and/or other display settings to improve visualization of model geometry in the lightweight viewer. Color modifications may facilitate the model definition to be simultaneously interpreted utilizing requirement zones defined by different colors. Transparencies may be used to set only specific color objects of a model to a transparency level to expose non-transparent internal features or other aspects of the model. Contrast can be used to change shading of objects to improve visualization of boundaries between adjacent objects. The combination of the tools disclosed herein allow users with visual color deficiencies to be able to quickly configure a model display to better interpret the requirements based on their needs.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A user interface for a lightweight viewer comprising:

a viewing window operable to display geometry established by one or more geometric objects of a tessellated model, the one or more geometric objects including one or more visual attributes that depict the respective geometry; and a palette menu established by a plurality of menu objects of the tessellated model, wherein the menu objects are assigned respective visual attribute settings, the menu objects are associated with the one or more geometric objects such that selection of the respective menu object causes at least one of the one or more visual attributes of the associated one or more geometric objects to update in the viewing window according to the respective visual attribute setting.

2. The user interface as recited in claim 1, wherein one or more of the menu objects are operable to toggle between activation of at least two of the visual attribute settings in response to user interaction with the palette menu.

3. The user interface as recited in claim 1, wherein the menu objects include a first set of menu objects assigned different visual attribute settings associated with a common visual attribute type.

4. The user interface as recited in claim 1, wherein the visual attributes are associated with a color attribute type associated with a set of colors and a transparency attribute type associated with a set of transparency levels.

5. The user interface as recited in claim 1, wherein the palette menu is selectively displayed in a portion of a display region common with the viewing window in response to user interaction with a control object of the tessellated model.

6. The user interface as recited in claim 1, wherein the visual attributes are associated with a first mode and a second mode of the tessellated model associated with different depictions of the geometry, the menu objects include a first menu object and a second menu object, the first menu object is operable to cause all of the one or more geometric objects to be displayed in the viewing window according to the first mode, and the second menu object is operable to cause all of the one or more geometric objects to be displayed in the viewing window according to the second mode.

7. The user interface as recited in claim 1, wherein the visual attribute settings include a first set of attribute settings and a second set of attribute settings, and the menu objects include an invert menu object operable to toggle between applying the first and second sets of attribute settings to the one or more menu objects.

8. The user interface as recited in claim 1, wherein the menu objects are established according to a hierarchy such that selection of one of the menu objects at a relatively higher level of the hierarchy causes the respective one or more geometric objects to be displayed in the viewing window according to the respective visual attribute setting and blocks activation of the visual attribute setting associated with any menu object at a relatively lower level of the hierarchy when the menu object at the relatively higher level is active.

9. The user interface as recited in claim 1, wherein the tessellated model excludes any CAD model associated with the geometry.

10. A system for generating a tessellated model comprising:

a computing device including one or more processors coupled to memory;

wherein the computing device is operable to execute a modeling environment, and the modeling environment is operable to:

access a computer-aided design (CAD) model associated with geometry;

generate one or more geometric objects that establish a tessellation of the geometry, the one or more geometric objects including one or more visual attributes that depict the respective geometry;

generate a plurality of menu objects associated with the one or more geometric objects;

assign respective visual attribute settings to the menu objects;

generate a tessellated model including the one or more geometric objects and the menu objects;

wherein the one or more geometric objects are operable to display the tessellation of the geometry in a viewing window of a user interface; and wherein the menu objects are operable to establish a palette menu in the user interface, and the menu objects are operable to cause the viewing window to depict the respective one or more geometric objects according to the respective visual attribute settings in response to user interaction.

11. The system as recited in claim 10, wherein the menu objects include a first set of menu objects assigned different visual attribute settings associated with a common one of the visual attributes.

12. The system as recited in claim 10, wherein the menu objects include a first menu object and a second menu object, the first menu object is operable to apply one or more respective visual attribute settings to all the one or more geometric objects, and the second menu object is operable to apply one or more different visual attribute settings to all the one or more geometric objects.

13. The system as recited in claim 10, wherein the visual attribute settings include a first set of attribute settings and a second set of attribute settings, and the menu objects include an invert menu object operable to toggle between applying the first and second sets of attribute settings to the one or more geometric objects.

14. The system as recited in claim 10, wherein the menu objects are established according to a hierarchy such that selection of one of the menu objects at a relatively higher level of the hierarchy causes the respective one or more geometric objects to be displayed in the viewing window according to the respective visual attribute setting and blocks activation of the visual attribute setting associated with any menu object at a relatively lower level of the hierarchy when the menu object at the relatively higher level is active.

15. The system as recited in claim 10, wherein the modeling environment is operable to:

store the tessellated model in a file readable by a lightweight viewer, the file excluding the CAD model.

16. The system as recited in claim 15, wherein the modeling environment is operable to:

store code in the file that is operable to cause one or more functions associated with the tessellated model to execute in the lightweight viewer.

17. A method of establishing a tessellated model comprising:

generating one or more geometric objects that establish a tessellation of geometry stored in a computer-aided design (CAD) model, wherein the one or more geometric objects are operable to display the tessellation of the geometry in a viewing window of a user interface, and the one or more geometric objects include one or more visual attributes that depict the respective geometry;

generating a plurality of menu objects associated with the one or more geometric objects, wherein the menu objects are operable to establish a palette menu in the user interface;

assigning respective visual attribute settings to the menu objects, wherein the menu objects are operable to cause the viewing window to depict the respective one or more geometric objects according to the respective visual attribute settings in response to user interaction; and generating a tessellated model including the one or more geometric objects and the menu objects.

18. The method as recited in claim 17, wherein:

the visual attributes are associated with a color attribute type associated with a set of colors and a transparency attribute type associated with a set of transparency levels; and the step of generating the menu objects occurs such that the palette menu displays a set of menu items associated with the set of colors and the set of transparency levels.

19. The method as recited in claim 17, wherein the menu objects are established according to a hierarchy such that selection of a menu object relatively higher in the hierarchy blocks activation of the visual attribute setting associated with any lesser menu object in the hierarchy to the respective one or more geometric objects prior to deactivation of the higher menu object, but permits activation of the visual attribute setting associated with the lesser menu object subsequent to deactivation of the higher menu object.

20. The method as recited in claim 17, further comprising:

storing the tessellated model in a file that excludes the CAD model.

21. The method as recited in claim 20, further comprising:

displaying the tessellated model in a lightweight viewer.

* * * * *